Jan. 1, 1946.  H. A. WILSON  2,392,077
PRESSURE COOKER
Filed Nov. 13, 1943
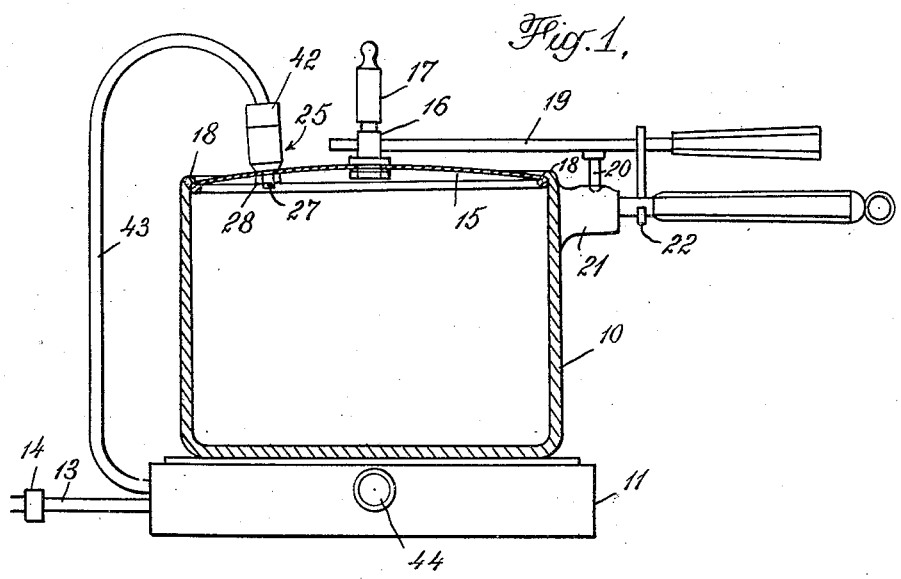
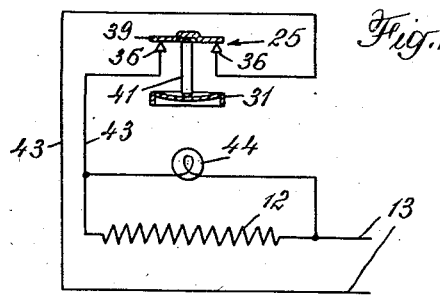
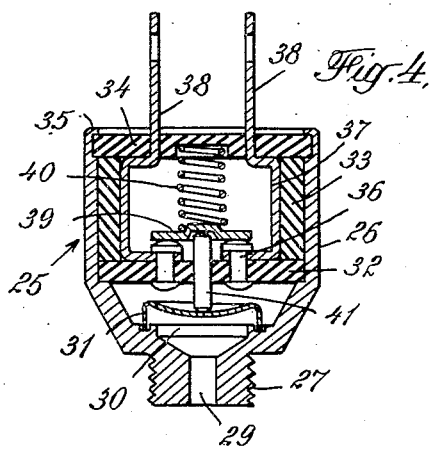
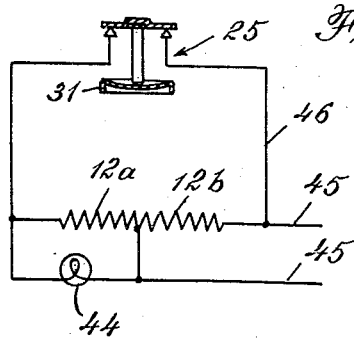
INVENTOR
Harry A. Wilson
BY
Pennie Davis Marvin Edmonds
ATTORNEYS Patented Jan. 1, 1946

2,392,077

UNITED STATES PATENT OFFICE 2,392,077

PRESSURE COOKER

Harry A. Wilson, Rumson, N. J., assignor to The Wilcolator Company, Elizabeth, N. J., a corporation of Delaware Application November 13, 1943, Serial No. 510,233

14 Claims. (Cl. 219—43)

This invention relates to pressure cookers of the type commonly used for domestic cooking and preserving and is concerned more particularly with a novel pressure cooker unit, which includes a heating element and means by which the operation of the element can be automatically controlled to maintain the pressure inside the cooker within limits during the use of the apparatus. The new cooker is safe in operation and of simple construction, and it may be readily cleaned and kept in sanitary condition by ordinary methods without liability of being damaged.

Pressure cookers for domestic use are generally recognized as offering numerous advantages over ordinary cooking utensils, in that their use permits a great saving in time and fuel and also makes possible the cooking of foods without such loss in vitamin content as occurs when foods are boiled in water in the usual way. The marketing of such pressure cookers as now constructed has been somewhat hampered, however, by the possible hazards incident to their use. The development of steam pressure within a cooker takes only a short time and, if the cooking operation is not closely watched, the pressure may exceed safe working limits. The generation of such high pressure in a cooker not provided with a pressure relief device may cause an explosion releasing superheated steam capable of causing serious burns and, even if the cooker is equipped with such a device, the functioning of the device releases live steam at considerable pressure and with a loud noise.

The problem of controlling the operation of a pressure cooker to prevent the generation of excessive steam pressure therein is made more difficult by a number of factors. Any control means employed should be light and compact and it should function properly, regardless of the amount of food being cooked. Also, it should be capable of being applied to the vessel without danger that leaks may develop and it should be constructed that it will not be damaged when the parts of the utensil are washed in hot water. These requirements prevent the use of a control for the heating element of the type which includes a thermostatic element mounted on the outside of the cooker, because, in the short time required for the usual cooking operation, the outside temperature of the vessel is not in fixed relation to the steam pressure therein but varies with the amount of cold food in contact with the vessel. A pressure-responsive switch of conventional form is also not a satisfactory solution of the problem, because such switches are bulky and, if such a switch is mounted on the cover and connected to the heating element by permanent connections, the cover is cumbersome to handle and it cannot be cleaned by water without possible injury to the switch or connections. If the switch is mounted elsewhere on the vessel, its steam inlet may be clogged by food so that the switch is unreliable in action and if the switch is mounted apart from the vessel, it must be connected to the interior thereof by a steam connection, which interferes with the washing of the cover after use.

The present invention is directed to the provision of a pressure cooker which is made safe in operation by the provision therein of means which maintains the pressure within the vessel during cooking within safe limits and is sensitive and reliable. The protective means includes a novel pressure-responsive switch provided with terminals by which the switch may be connected detachably in circuit with the heating element and the switch is small, compact, and of light weight and it is permanently mounted on the cover in leakproof fashion. The switch is waterproof, and, since it may be quickly disconnected from the electrical connections to the heating element, the mounting of the switch on the cover in no way interferes with the ordinary handling of the cover or with its being immersed in water for cleaning purposes.

In the operation of the new cooker, the protective device shuts off the current to the heating element when a safe pressure within the vessel is reached and turns the current on when the pressure falls below a lower limit. Whenever the switch functions, it produces a sharp audible click which serves as a signal. If desired, the cooker may also be provided with a signal lamp which remains lighted whenever the heating element is connected to receive current.

For a better understanding of the invention, reference may be had to the accompanying drawing, in which Fig. 1 is a vertical sectional view of the new pressure cooker;

Figs. 2 and 3 are wiring diagrams that may be used; and

Fig. 4 is a vertical sectional view on an enlarged scale of the pressure switch employed.

The cooker illustrated in Fig. 1 comprises a pot 10, which may be of any suitable form, and a base 11 on which the pot rests. The base contains a heating element 12 and the element is provided with the usual cord 13 terminating in a plug 14 having prongs which may be inserted in an electrical receptacle to connect the element to a source of current.

The pot is provided with a cover 15 having a vent tube 16 mounted centrally thereof. The tube is opened through the cover and it may be closed by a weight 17, which is slipped over the top of the outlet end of the tube when pressure is to be maintained. The cover seats against an overhanging rim 18 on the pot and initially it is held in place by a lever 19 secured to the vent tube assembly and having a fulcrum member 20 which rests in a depression in the top of boss 21 forming part of the pot handle, the lever being provided with a hook 22 which may be hooked over the stem of the handle.

Mounted in an opening through the cover between its rim and the vent tube is a pressure switch 25. This switch includes a housing 26 terminating in a threaded neck 27 which passes through the opening in the cover and is held in place by nut 28. A passage 29 through the neck leads to a chamber 30 within the housing and closed at its top by a dished diaphragm 31 which has a peripheral cylindrical flange anchored in a groove in the wall of the housing in any suitable way, as by soldering.

A plate 32 of insulating material is seated on a circumferential shoulder on the wall of the housing above the diaphragm 31 and this plate is held in position by a tubular section 33 of insulating material and a top plate 34 of insulating material, which is held in position by an inturned rim 35 on the housing. A pair of contacts 36 are mounted in openings in plate 32 and these contacts pass through and are electrically connected to respective terminal members 37 which extend upwardly along the inner surface of tube 33 and terminate in prongs 38 which pass outward from the casing through openings in plate 34. Prongs 38 are of the shape and form of the prongs of an ordinary electrical plug.

The ends of the contacts 36 lying within the chamber defined by the insulating members are bridged by a member 39 which is forced into engagement with the contacts by a spring 40 seated at one end on the member and at the other in a depression in the inner surface of plate 34. A pin 41 is mounted in an opening through plate 34 between the contacts 36 and the pin bears at one end against the under surface of the bridge member 39 and at the other against the upper surface of the diaphragm 31.

The prongs 38 of the switch are receivable in openings in a conventional receptacle 42 to make contact with terminals therein and these terminals are connected to conductors in a cord 43. The electrical circuits employed may vary somewhat but if the cooker is provided with connections as shown in the diagram in Fig. 2, one of the conductors 43 leading from the terminals in receptacle 42 is connected within the base to one of the conductors in cord 13 and the other conductor from receptacle 42 is connected to one end of the heating element 12, the other end of the element being connected to a conductor in cord 13. The lamp 44 is then connected across the terminals to the heating element.

In the use of the cooker described, the food and the usual small quantity of water are placed in the pot 10 and the cover is then placed in the top of the pot and held in position by lever 19 and hook 22. The receptacle 42 is then mounted on prongs 38 of the switch. When the prongs of plug 14 are inserted in a receptacle to connect the cooker to a source of power, current may flow through the heating element and the signal lamp, since diaphragm 31 is in its initial position with its upper face concave. As the heating progresses, pressure is generated within the vessel and builds up until it reaches a value at which it acts on the diaphragm and causes the central portion thereof to snap to a position in which its upper surface is convex. This movement of the diaphragm causes pin 41 to raise the bridge member 39 from engagement with contacts 36 and the circuit through the heating element and lamp is then opened and the flow of current is stopped.

In some instances, the cooking will be complete when the pressure has reached the value at which diaphragm 31 operates, but, for some purposes, a longer cooking operation may be necessary. When the heating element is shut off, the pressure within the vessel will begin to decrease as heat is lost therefrom and when the pressure falls below a selected limit, the diaphragm will snap back to its original condition and this will cause contacts 36 to be bridged by member 39 and current to flow again to the heating element. Whenever it is desired to stop the heating at any time prior to the operation of the switch, the current may be shut off either by disconnecting the plug 14 from its receptacle or removing receptacle 42 from the top of the switch. With receptacle 42 removed, the cover can be taken off the pot and cleaned by washing in the usual way, since water cannot enter the switch through the diaphragm or through plate 34.

In cookers for some uses, it may be desirable to divide the winding of the heating element so that only part thereof is under the control of the pressure switch and connections suitable for the purpose are illustrated in the wiring diagram of Fig. 3. In this arrangement, the heating element is divided into two portions, 12a, 12b. Portion 12b is connected directly to power lines 45 so that current flows through this portion of the winding, whenever the lines 45 are connected to a source of power. The part 12a of the winding is connected to one of the lines 45 through a circuit 46 containing the pressure switch 25, so that current may flow through part 12a only when the pressure within the vessel is below the safe limit. The pilot lamp 44 is connected across the part 12a of the winding and is lighted only when the entire winding is functioning.

From the foregoing, it will be apparent that the new pressure cooker is superior to similar prior cookers, in that it is entirely safe in operation and that the result is achieved without the necessity of releasing steam from the interior of the vessel when the upper limit of pressure is reached. Also, since the pressure switch is light and compact, its presence on the cover does not impede the user in the ordinary handling of the cover. The prongs of the switch and the receptacle in which such prongs are received form a quick detachable coupling by which the electrical conductors can be quickly connected or disconnected from the switch, as desired, and when the conductors are disconnected, the cover may be cleaned by immersion in water in the usual way, since the switch is waterproof.

I claim:

1. In a portable pressure cooker for the quick cooking of foods including a cooking receptacle for the food to be cooked, a fluid-and-pressure-tight cover secured thereto, and a heating element for heating the receptacle, a relatively small compact switch for controlling the supply of current to the heating element including a waterproof housing mounted directly upon the cover and separated from the inside of the receptacle by a dished snap-acting diaphragm sealed with respect to the cover and having its convex side facing into and subject to the pressure inside the cooking receptacle, contacts within the housing, terminals connected to the contacts within the housing and projecting therefrom, a quick detachable coupling engaging said terminals for connecting the terminals to the heating element and to a source of power, respectively, and means actuated by said snap-acting diaphragm for opening the switch at a predetermined cooking pressure generated within said cooking receptacle.

2. The combination with a pressure cooker having a cooking receptacle, a cover therefor, and means for heating the receptacle, of a switch mounted directly upon the cover and including contacts enclosed within a waterproof housing and having terminals accessible from outside the housing, connections for detachably connecting the terminals to the heating means and a source of power, respectively, and means responsive to pressure generated within the receptacle for actuating the switch.

3. The combination with a pressure cooker having a cooking receptacle, a cover therefor, and means for heating the receptacle, of a switch mounted directly upon the cover and including contacts enclosed within a waterproof housing and having terminals projecting outside the housing, a receptacle in which the terminals are receivable, connections for connecting the terminals through the receptacle to the heating means and a source of power, respectively, and means responsive to pressure generated within the cooking receptacle for actuating the switch.

4. The combination with a pressure cooker having a cooking receptacle, a cover therefor, and means for heating the receptacle, of a switch mounted directly upon the cover and including contacts enclosed within a waterproof housing, a coupling which includes terminals connected within the housing to the switch contacts and projecting out of the housing and a receptacle for receiving the terminals, electrical connections from the coupling to the heating means and a source of power, respectively, and means responsive to pressure generated within the cooking receptacle for actuating the switch.

5. The combination with a pressure cooker having a cooking receptacle, a cover therefor, and means for heating the receptacle, of a switch mounted directly upon the cover and including contacts enclosed within a waterproof housing, a coupling which includes terminals connected within the housing to the switch contacts and projecting out of the housing and a receptacle for receiving the terminals, electrical connections from the coupling to the heating means and a source of power, respectively, and snap action means responsive to pressure generated within the cooking receptacle for actuating the switch.

6. The combination with a pressure cooker having a cooking receptacle, a cover therefor, and means for heating the receptacle, of a switch mounted directly upon the cover and including contacts enclosed within a waterproof housing, a coupling which includes terminals connected within the housing to the switch contacts and projecting out of the housing and a receptacle for receiving the terminals, electrical connections from the coupling to the heating means and a source of power, respectively, and means responsive to pressure within the cooking receptacle for actuating the switch and including a dished diaphragm closing an orifice through the cover.

7. The combination with a pressure cooker having a cooking receptacle, a cover therefor, and means for heating the receptacle, of a switch mounted directly upon the cover and including contacts enclosed within a waterproof housing and having terminals accessible from outside the housing, connections for detachably connecting the terminals to the heating means and a source of power, respectively, and means, including a dished diaphragm exposed to pressure generated within the cooking receptacle for actuating the switch.

8. The combination with a pressure cooker having a cooking receptacle, a cover therefor, and means for heating the receptacle, of a waterproof switch mounted directly upon the cover, connections for connecting the switch to the heating means and to a source of power, respectively, a quick detachable coupling in the connections adjacent the switch, and snap action means responsive to pressure generated within the receptacle for actuating the switch.

9. The combination with a pressure cooker having a cooking receptacle, a cover therefor, and means for heating the receptacle, of a waterproof switch mounted directly upon the cover, connections for connecting the switch to the heating means and to a source of power, respectively, a quick detachable coupling in the connections adjacent the switch, and means for actuating the switch, including a dished diaphragm exposed to pressure generated within the receptacle.

10. In a pressure cooker which includes a cooking receptacle, a cover therefor, and a heating element for heating the receptacle, the combination of a switch controlling the supply of current to the heating element and including a housing mounted directly on the cover and containing a waterproof chamber, contacts in the chamber, a spring-pressed bridge member normally connecting the contacts, a diaphragm within the housing exposed to pressure within the receptacle, an element through which the diaphragm may act to move the member from the contacts, and terminals connected within the chamber to the contacts and extending out of the chamber, and an electrical receptacle for receiving the exposed portions of the terminals and with the latter forming a quick detachable coupling.

11. In a pressure cooker which includes a cooking receptacle, a cover therefor, and a heating element for heating the receptacle, a switch for controlling the supply of current to the heating element including a housing adapted to be mounted on the cover and having an inlet passage from the cooking receptacle, a diaphragm closing the passage, a waterproof chamber within the housing, contacts within the chamber, terminals connected within the chamber to the contacts and projecting out of the housing, a spring-pressed member within the chamber normally connecting the contacts, and a pin engaging the diaphragm and operable thereby to free the member from the contacts.

12. In a pressure cooker which includes a cooking receptacle, a cover therefor, and a heating element for heating the receptacle, a switch for controlling the supply of current to the heating element, including a housing adapted to be mounted on the cover and having a portion extending through an opening in the cover, a passage in said portion, a diaphragm within the housing closing the passage, a waterproof chamber within the housing, contacts within the chamber, terminals connected within the chamber to the contacts and projecting out of the housing, a spring-pressed member within the chamber normally connecting the contacts, and a pin extending through a wall of the chamber and engaging the diaphragm and member, the pin being operable by the diaphragm to free the member from the contacts.

13. The combination with a pressure cooker having a cooking receptacle, a cover therefor, and means for heating the receptacle, of a switch mounted directly upon the cover having snap acting means responsive to pressures generated within the receptacle for actuating the switch and producing an audible signal, and detachable connections for connecting the switch to the heating means.

14. The combination with a pressure cooker having a cooking receptacle, a cover therefor, and means for heating the receptacle, of a snap acting means mounted upon the cover responsive to pressures generated within the receptacle for producing an audible signal at a predetermined pressure.

HARRY A. WILSON.